(12) United States Patent
Koka et al.

(10) Patent No.: US 9,235,529 B2
(45) Date of Patent: *Jan. 12, 2016

(54) USING BROADCAST-BASED TLB SHARING TO REDUCE ADDRESS-TRANSLATION LATENCY IN A SHARED-MEMORY SYSTEM WITH OPTICAL INTERCONNECT

(75) Inventors: Pranay Koka, Austin, TX (US); David A. Munday, Santa Cruz, CA (US); Michael O. McCracken, San Diego, CA (US); Herbert D. Schwetman, Jr., Austin, TX (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 833 days.

This patent is subject to a terminal disclaimer.

(21) Appl. No.: 13/565,476

(22) Filed: Aug. 2, 2012

(65) Prior Publication Data
US 2015/0301949 A1   Oct. 22, 2015

(51) Int. Cl.
G06F 12/00 (2006.01)
G06F 12/10 (2006.01)
H04Q 11/00 (2006.01)

(52) U.S. Cl.
CPC ............ *G06F 12/1027* (2013.01); *G06F 12/10* (2013.01); *G06F 2212/1024* (2013.01); *G06F 2212/682* (2013.01); *H04Q 2011/0052* (2013.01)

(58) Field of Classification Search
None
See application file for complete search history.

(56) References Cited

U.S. PATENT DOCUMENTS

| | | | | |
|---|---|---|---|---|
| 7,433,300 B1 * | 10/2008 | Bennett | ............... | G06F 11/2005 370/216 |
| 7,669,011 B2 * | 2/2010 | Conway | .............. | G06F 12/0815 711/124 |
| 8,364,932 B2 * | 1/2013 | Ali | ...................... | G06F 12/1009 711/205 |

* cited by examiner

*Primary Examiner* — Jared Rutz
*Assistant Examiner* — William E Baughman
(74) *Attorney, Agent, or Firm* — Park, Vaughan, Fleming & Dowler LLP; Mark Spiller

(57) ABSTRACT

The disclosed embodiments provide a system that uses broadcast-based TLB sharing to reduce address-translation latency in a shared-memory multiprocessor system with two or more nodes that are connected by an optical interconnect. During operation, a first node receives a memory operation that includes a virtual address. Upon determining that one or more TLB levels of the first node will miss for the virtual address, the first node uses the optical interconnect to broadcast a TLB request to one or more additional nodes of the shared-memory multiprocessor in parallel with scheduling a speculative page-table walk for the virtual address. If the first node receives a TLB entry from another node of the shared-memory multiprocessor via the optical interconnect in response to the TLB request, the first node cancels the speculative page-table walk. Otherwise, if no response is received, the first node instead waits for the completion of the page-table walk.

20 Claims, 8 Drawing Sheets

USING BROADCAST-BASED TLB SHARING TO REDUCE ADDRESS-TRANSLATION LATENCY IN A SHARED-MEMORY SYSTEM WITH OPTICAL INTERCONNECT

GOVERNMENT LICENSE RIGHTS

This invention was made with United States Government support under Agreement No. HR0011-08-9-0001 awarded by the Defense Advanced Research Projects Administration (DARPA). The United States Government has certain rights in the invention.

BACKGROUND

1. Field of the Invention

This disclosure generally relates to techniques for reducing latency in shared-memory multiprocessor computer systems. More specifically, this disclosure relates to techniques for reducing address-translation latency in shared-memory multiprocessor systems.

2. Related Art

Computer memory is typically divided into a set of fixed-length blocks called "pages." An operating system can provide a virtual memory abstraction to give a program the impression that it is accessing a contiguous address space that is larger than the actual available physical memory of the underlying computer system. During operation, the operating system and hardware of the computing device translate virtual addresses into physical addresses in the physical memory. These translated physical addresses are then used to access the desired data from the memory hierarchy.

The latency caused by such address translation can significantly impact the performance of shared-memory server systems. Accessing a virtual address typically involves using specialized translation hardware to determine a corresponding physical memory address. This translation hardware often includes a translation lookaside buffer (TLB) which caches page-table translation information to improve the speed of virtual address translations. Modern processors use multiple levels of such TLBs to avoid the latency of page-table lookups. However, growing data-set sizes and an increase in the number of hardware threads that share a TLB are increasing TLB pressure, thereby resulting in increased TLB miss rates. In modern multiprocessor systems, a miss in a multi-level TLB initiates a page-table walk, which typically involves several DRAM accesses that can take hundreds of clock cycles to complete. In the worst case, a memory instruction first misses in the TLB (e.g., during translation) and then also misses in the cache hierarchy, resulting in an even larger delay.

Hence, what is needed are system structures and techniques for managing virtual address translations without the above-described problems of existing techniques.

SUMMARY

The disclosed embodiments provide a system that uses broadcast-based TLB sharing to reduce address-translation latency in a system with two or more nodes that are connected by an optical interconnect. During operation, a first node receives a memory operation that includes a virtual address. Upon determining that one or more TLB levels of the first node will miss for the virtual address, the first node uses the optical interconnect to broadcast a TLB request to one or more additional nodes of the shared-memory multiprocessor in parallel with scheduling a speculative page-table walk for the virtual address. If the first node receives a TLB entry from another node of the shared-memory multiprocessor via the optical interconnect in response to the TLB request, the first node cancels the speculative page-table walk. Otherwise, if no response is received, the first node instead waits for completion of the page-table walk.

In some embodiments, broadcasting the TLB request involves distinguishing the TLB request from other request traffic from the first node and selectively replicating TLB requests to ensure that the TLB request node is sent to all of the other nodes of the shared-memory multiprocessor system via the optical interconnect.

In some embodiments, the optical interconnect comprises a point-to-point network between the nodes of the shared-memory multiprocessor system. This optical point-to-point network carries TLB requests, TLB entries, and cache coherency traffic.

In some embodiments, a first link in the optical point-to-point network and a second link in the optical point-to-point network use different wavelengths in a single optical beam.

In some embodiments, the optical interconnect comprises an optically switched interconnect that facilitates communication between the nodes of the shared-memory multiprocessor system. This optically switched interconnect carries TLB requests, TLB entries, and cache coherency traffic. In some embodiments, a smart switch in the optically switched interconnect replicates the TLB request and sends the replicated TLB requests to two or more nodes of the shared-memory multiprocessor system.

In some embodiments, a TLB controller in the first node replicates the TLB request and sends the replicated TLB requests to the other nodes of the shared-memory multiprocessor system.

In some embodiments, a link arbiter in the first node replicates the TLB request and sends the replicated TLB requests to the other nodes of the shared-memory multiprocessor system.

In some embodiments, broadcasting the TLB request facilitates: not partitioning TLB entries for a virtual address space across two or more nodes of the shared-memory multiprocessor system; not including additional hardware directory structures that track which TLB entries are being cached by nodes of the shared-memory multiprocessor system; and not including additional hardware to maintain shared state for TLB entries across the nodes of the shared-memory multiprocessor system.

In some embodiments, a modified last-level TLB controller in the first node is configured to: track the state of TLB requests that are broadcast to other nodes; issue speculative TLB page-table walks; determine whether an incoming response relates to a pending TLB request and, if so, cancel an associated speculative TLB page-table walk; and determine whether the output of a speculative TLB page-table walk relates to a pending TLB request and, if so, remove the tracked state for the pending TLB request.

In some embodiments, a modified link arbiter in the first node is configured to analyze traffic to correctly route requests and responses to and from a cache controller and the modified last-level TLB controller.

In some embodiments, a modified lowest-level TLB in the first node is extended to accommodate additional TLB request traffic from other nodes. For example, the modified lowest-level TLB may be configured to include multiple read ports per bank; one or more read ports receive TLB requests from processor cores local to the first node, while one or more other read ports receive TLB requests from other nodes via the electrical interconnect.

DETAILED DESCRIPTION

Figure 1:
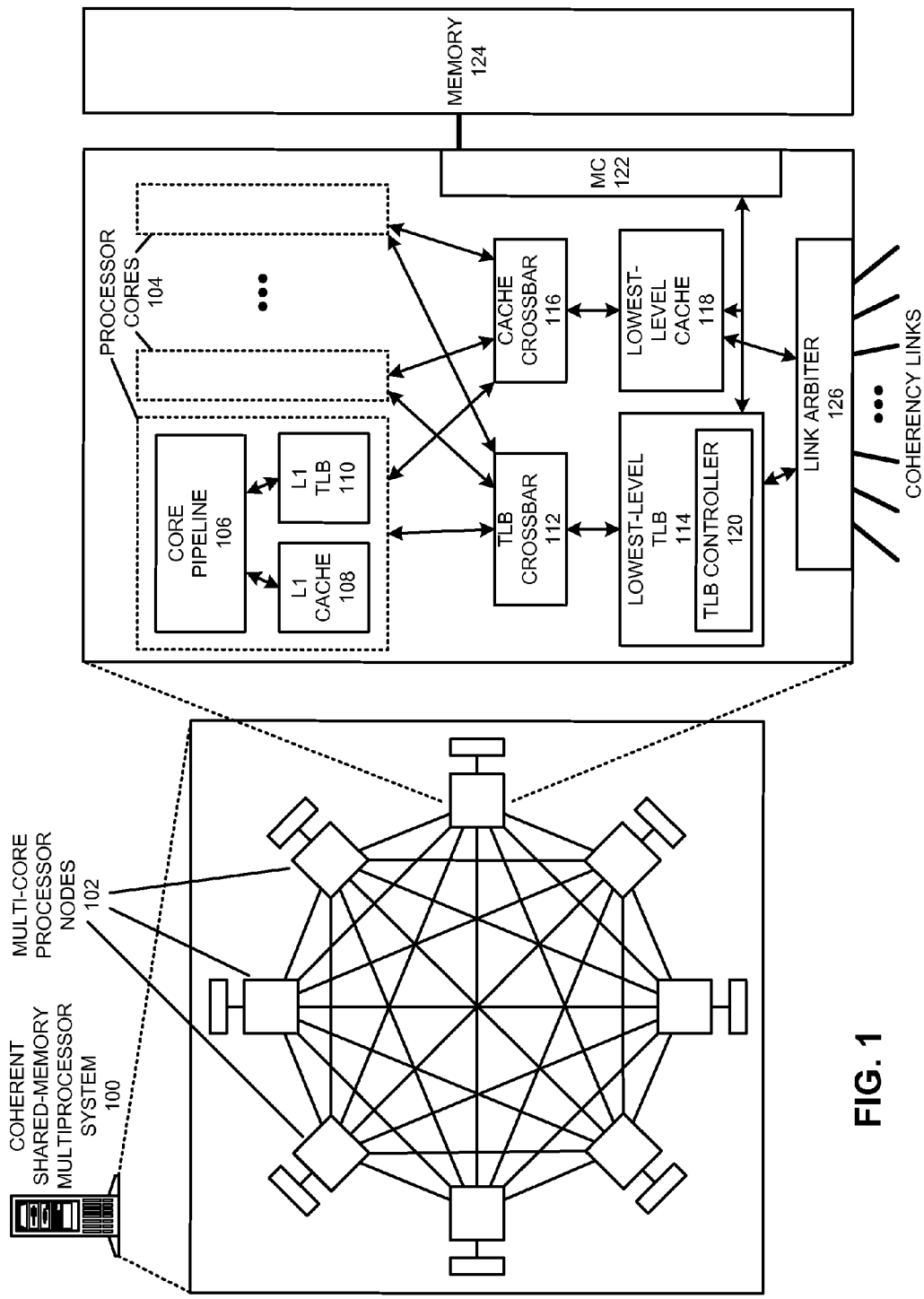
FIG. 1 illustrates an exemplary architecture of one or more multi-core processors in a coherent shared-memory multiprocessor system in accordance with an embodiment.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

1. TLB Limitations in Multiprocessor Systems

The latency caused by address translation can significantly impact the performance of shared-memory multiprocessor systems. Modern high-performance multiprocessors typically devote large areas of semiconductor real estate to specialized hardware structures that cache frequently accessed data and speed up address translations. For instance, such specialized hardware structures may include multiple levels of SRAM (or DRAM) caches and multiple levels of translation lookaside buffers (TLBs), which cache page-table translations to avoid the high latency of page-table walks.

However, TLB performance is unfortunately degrading in current systems, and seems likely to continue to degrade in future systems. For instance, growing workload data-set sizes and ongoing increases in the number of hardware threads that share a TLB level increase TLB pressure, thereby increasing TLB miss rates. Furthermore, due to on-chip network and power limitations, future systems are likely to comprise multiple "chiplets" (e.g., small, independent chip multiprocessors that are combined to form a large-scale logically monolithic multiprocessor) interconnected by high performance optical networks. In such designs, a large last-level TLB per chiplet may not be an effective or achievable solution. For example, power and area constraints on a chiplet might not permit a large last-level TLB. Secondly, a large per-chiplet TLB only enables sharing within a given chiplet. In modern multiprocessor systems, a miss in a multi-level TLB initiates a page-table walk, which typically involves several DRAM accesses to read a (typically hierarchical) page table that stores the needed virtual-to-physical address mappings; such DRAM accesses can take hundreds of clock cycles to complete. Because multi-threaded server-class workloads share data among threads, a more desirable solution would involve sharing address translations fetched by other processor cores to reduce the number of page-table walks needed.

Figure 2:
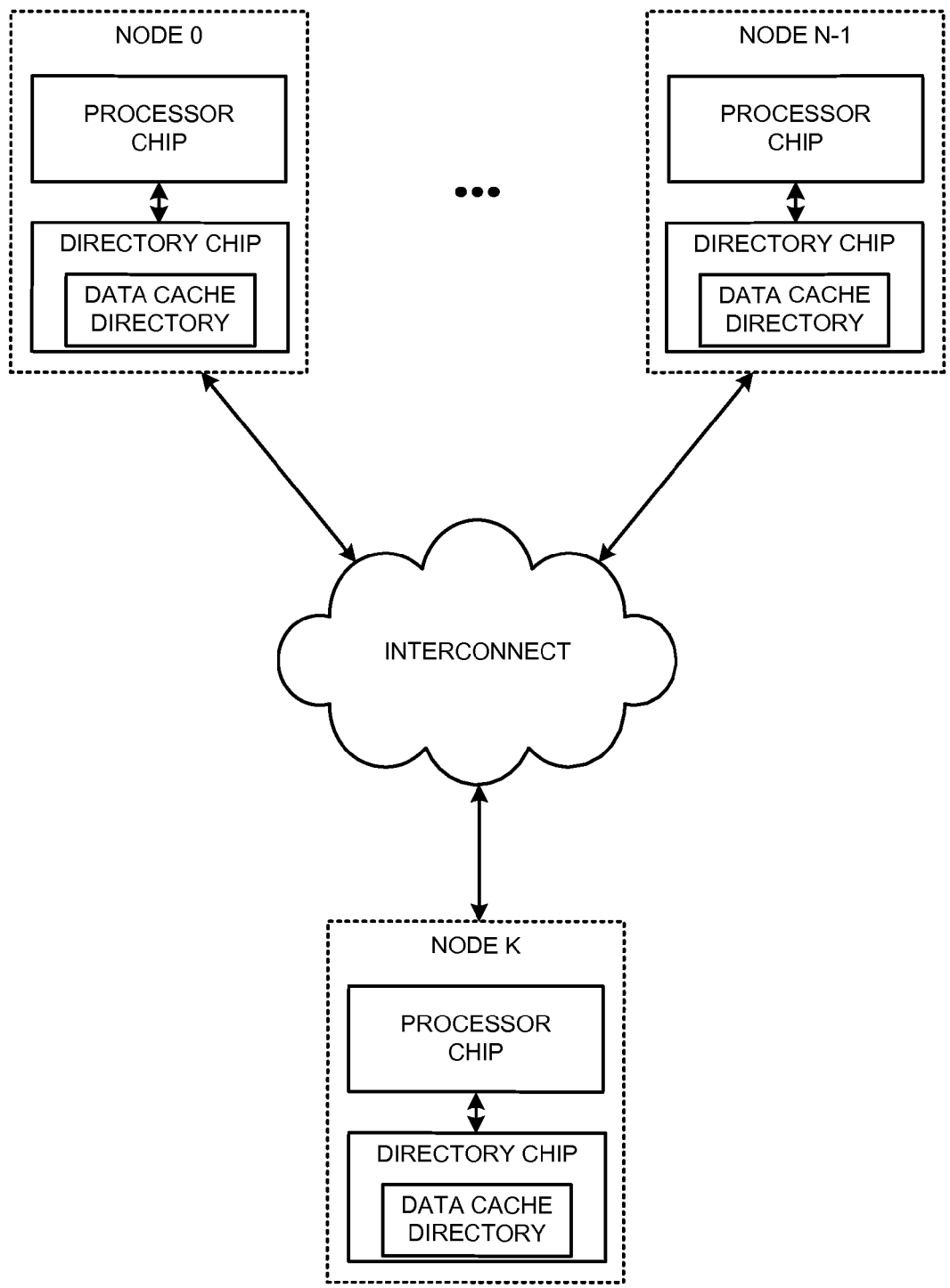
FIG. 2 illustrates a coherent shared-memory multiprocessor system with N multi-core processor nodes in accordance with an embodiment.

FIGS. 1-2 illustrate an exemplary architecture of one or more multi-core processor nodes 102 in a coherent shared-memory (COHSHM) multiprocessor system 100. In FIG. 1, multi-core processor nodes 102 each comprise a chip-multiprocessor and memory, and are interconnected using a point-to-point coherency network. Nodes 102 can use a range of coherency protocols (e.g., the MOESI or MESI cache coherency protocols) to perform remote memory accesses or otherwise communicate.

Multi-core processor nodes 102 illustrate an exemplary processor architecture in which two or more processor cores 104 each include a core pipeline 106 with a private L1 TLB 110 and L1 cache 108. The processor cores 104 access a shared lowest-level (e.g., L2) TLB 114 via a TLB crossbar 112 and access a shared lowest-level (e.g., L2) cache 118 via a second cache crossbar 116. A TLB controller 120 in TLB 114 can prompt a hardware page-table walker (not shown) to communicate with a memory controller (MC) 122 to access page tables in a shared memory 124 when address translations miss in TLB 114. A link arbiter 126 facilitates communication with other nodes of the COHSHM multiprocessor system 100 via a point-to-point coherence interconnect. Note that the described concepts are independent of the number of TLB and cache levels in a processor architecture, and can be implemented across a range of different processor architectures. Note also that the described concepts are independent of the interconnect topology that is used to connect the nodes of the coherent shared-memory multiprocessor, and can be implemented across a range of interconnect types and topologies (as described in later sections).

FIG. 2 illustrates a coherent shared-memory multiprocessor system with N multi-core processor nodes. In some embodiments, each node consists of a processor chip and a directory chip. The physical address space for coherent shared-memory multiprocessor system 100 can be partitioned among the nodes, with each directory chip serving as the "home" (e.g., containing a data cache directory (DC DIR)) for a subset of the physical address space. The DC DIR in a node maintains state for every cache line in its allocated subset that is cached anywhere in the system. A range of coherence protocols (e.g., the MOESI cache coherency protocol) can be used to maintain cache coherence across the nodes. Note that the architectures illustrated in FIGS. 1-2 are exemplary, and that the described techniques are not limited to the illustrated shared-memory systems; the described techniques and structures can be applied to a range of other architectures. For example, the multi-core processor and directory chip (or even multiple processors and directories) may be combined into one hardware unit. Other alternative architectures may include directory chips that are external to the node, and/or have a range of different mappings of physical addresses (or memory pages) to directories and nodes.

Figure 3:
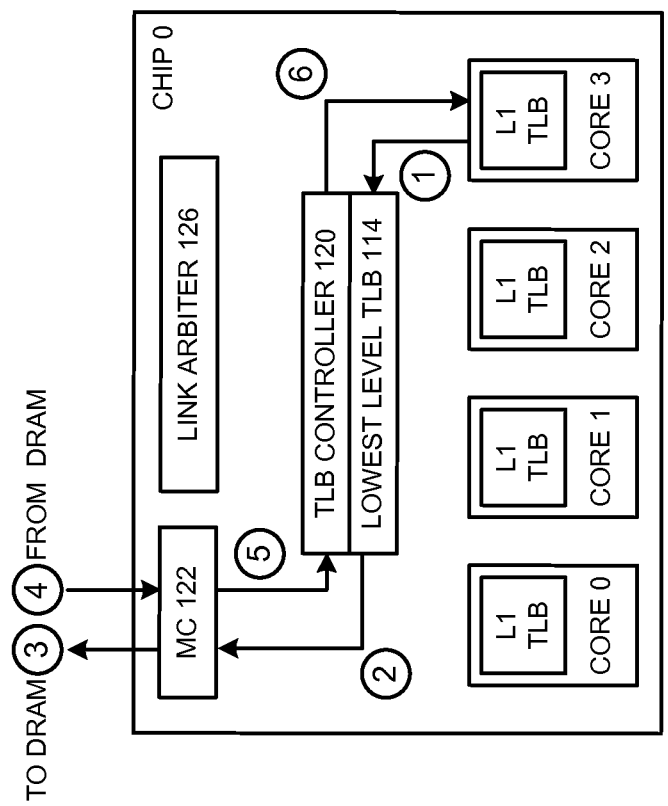
FIG. 3 illustrates the process of completing a virtual-to-physical address translation when an address translation misses in the lowest-level TLB of a node of a coherent shared-memory multiprocessor system in accordance with an embodiment.

FIG. 3 illustrates the process of completing a virtual-to-physical address translation when an address translation misses in the lowest-level TLB of a node of the type illustrated in FIG. 1. In FIG. 3, a processor core (core 3) in a multiprocessor chip misses in its L1 TLB, and requests the missed translation from the lowest-level (L2) TLB 114 (operation 1). The L2 TLB misses, which triggers the TLB controller 120 to send a page table walk request to the chip's memory controller (MC) 122 (operation 2). MC 122 then performs the operations necessary to resolve the page-table walk; typically, such operations involve accessing a DRAM n times for an n level page table. More specifically, this process comprises repeatedly accessing the system's page tables (operation 3), and using the data received from each access to calculate the address for the next access (operation 4). Thus, the page-table walk may take hundreds of clock cycles, depending on whether the various levels of the page tables that are needed are currently cached in levels of the data cache or need to be accessed from DRAM. After the page-table walk completes, MC 122 forwards the resolved page translation to TLB controller 120 (operation 5), which then simultaneously fills an appropriate TLB entry into TLB 114 and core 3's L1 TLB (operation 6), thereby allowing the needed translation to proceed.

The critical path latency for the TLB miss scenario of FIG. 3 is:

$$T_{critical} = T_{L1miss} + T_{L2miss} + n*(T_{DRAM\_acc} + T_{calc\_addr}) + T_{forward\_trans} + T_{fill\_trans},$$

where: $T_{L1miss}$ is the time needed to determine an L1 TLB miss; $T_{L2miss}$ is the time needed to determine an L2 TLB miss and send a request to the memory controller; n is the number of memory accesses required for a page-table walk; $T_{DRAM\_acc}$ is the time required for the memory controller to perform a DRAM access during a page-table walk; $T_{calc\_addr}$ is the time needed for the memory controller to receive memory access data and to calculate the next memory address to access for the next page-table level of the page-table walk; $T_{forward\_trans}$ is the time needed to forward a resolved page-table translation from the memory controller to the L2 TLB controller; and $T_{fill\_trans}$ is the time needed fill the L2 TLB with the required translation and to transfer and fill the received translation information into the L1 TLB. Note that the most significant latency in the above equation arises from the multiple DRAM accesses ("$n*(T_{DRAM\_acc} \ldots )$").

Embodiments of the present invention seek to reduce TLB miss rates (and thus reduce the number of page-table walks) by efficiently sharing TLB entries between processor cores and/or chips. For instance, the coherence interconnect of a cache-coherent shared-memory multiprocessor system can be leveraged to facilitate TLB sharing.

2. Broadcast Techniques for Sharing TLB Entries

In some embodiments, the contents of TLB structures in multiple nodes of a multiprocessor are shared to reduce address-translation latency. More specifically, broadcast-based mechanisms are used to share TLB entries between the TLB structures of multiple nodes (e.g., processor chips) of a cache-coherent shared-memory multiprocessor system without requiring additional hardware that maintains shared state. These techniques reduce translation latency by avoiding multiple long-latency page-table walks when the required page translations are being cached by other nodes of the system.

In some embodiments, a node encountering a TLB miss in its lowest-level TLB attempts to obtain a page translation from the TLB of a remote processor chip by broadcasting a TLB request to the other nodes of the cache-coherent shared-memory multiprocessor system in parallel with initiating a speculative page-table walk. Any of the other nodes that are currently caching the needed translation in their local TLBs (e.g., "sharing nodes") then respond by sending the needed translation information to the "requesting" (original) node; if the requesting node receives a response to its broadcast request, the requesting node cancels the speculative page-table walk. Nodes that do not cache a requested translation do not respond; if no responses are received by the requesting node, the speculative page-table walk completes, and the requesting node discards any state information associated with the request, thereby effectively ending the transaction. Note that this technique does not require prior knowledge of a sharing node's location or a fixed partitioning of virtual addresses to nodes and/or processors; any node caching the needed translation information can reply to the TLB request without any pre-arrangement or additional tracking of system state.

Figure 4:
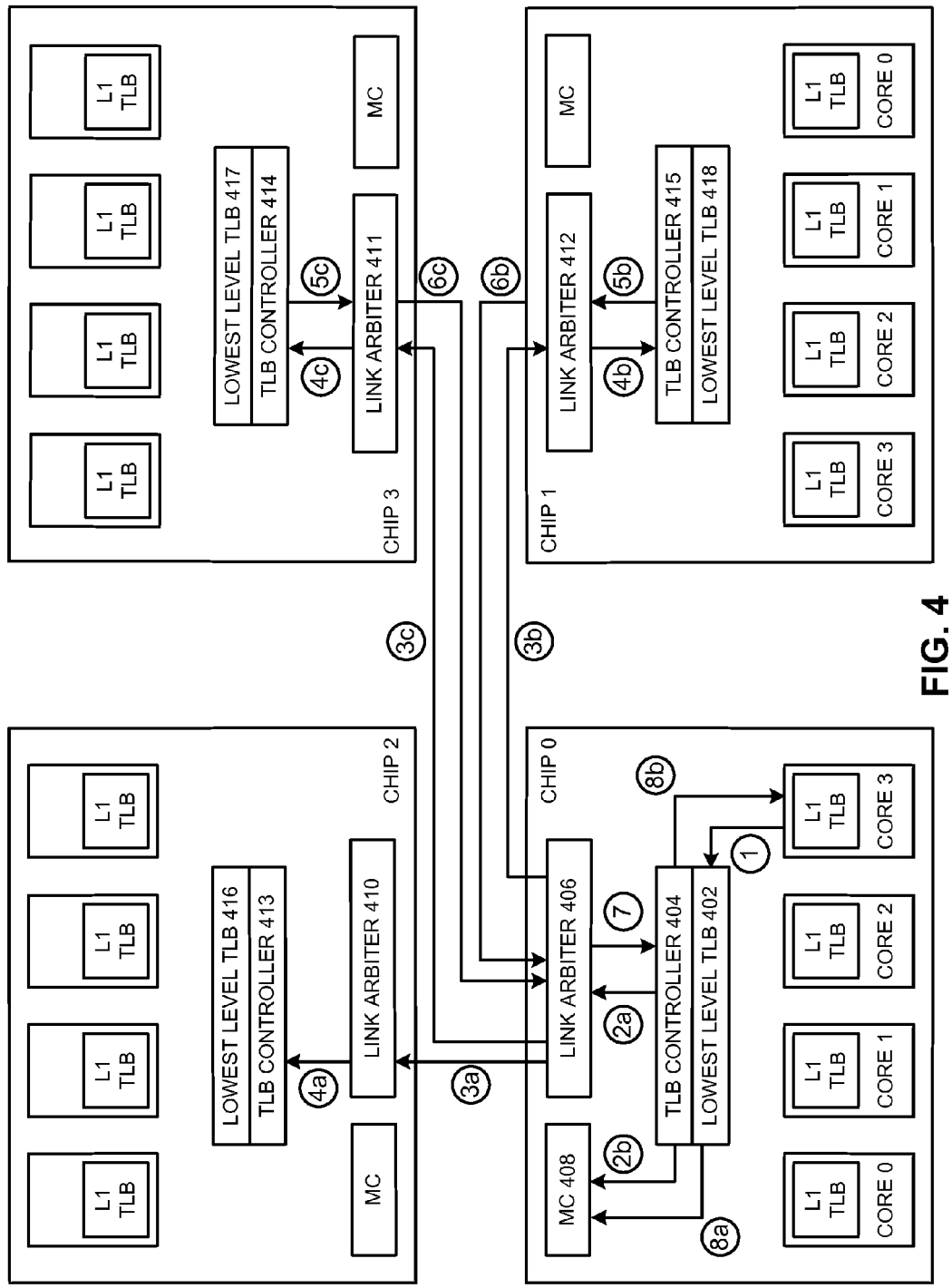
FIG. 4 illustrates the process of completing a virtual-to-physical address translation in a cache-coherent shared-memory multiprocessor system by broadcasting a TLB request and receiving translation information from a sharing node in accordance with an embodiment.

FIG. 4 illustrates the process of completing a virtual-to-physical address translation in a cache-coherent shared-memory multiprocessor system by broadcasting a TLB request and receiving translation information from a sharing node. During operation, a processor core in a node (e.g., core 3 of chip 0, in FIG. 4) experiences an L1 TLB miss, and forwards the request to its last-level (L2) TLB 402 (operation 1). L2 TLB 402 also misses, but now this miss triggers L2 TLB 402's TLB controller 404 to both: (1) forward the request to chip 0's link arbiter 406 (operation 2a), and (2) request a speculative page-table walk via chip 0's memory controller (MC) 408 (operation 2b). Link arbiter 406 sends TLB requests to the link arbiters 410-412 of each of the other processor chips (operations 3a, 3b, 3c). Link arbiters 410-412 each forward the received TLB request to their respective chip's TLB controllers 413-415 (operations 4a, 4b, 4c). Chip 2's TLB controller 413 probes chip 2's L2 TLB 416 for the requested translation, and upon determining a miss, takes no further action. Chip 1's TLB controller 415 and chip 3's TLB controller 414 probe their chips' respective L2 TLBs 418 and 417, and upon determining hits, forward the requested translation information to their respective link arbiters 412 and 411 (operations 5b and 5c), which send this information back to link arbiter 406 (operations 6b and 6c). Link arbiter 406 forwards the requested translation information to TLB controller 404 (operation 7), which simultaneously fills TLB 402 and core 3's L1 TLB with the translation information (operation 8b) and cancels the speculative TLB walk being performed by MC 408 (operation 8a). Note that in some implementations the memory controller (e.g., MC 408) is not the actual mechanism that initiates and/or performs a page-table walk. For example, the page-table walk may be initiated (and managed) by a TLB controller or another hardware mechanism, which issues the needed memory operations for the page-table walk to the cache hierarchy. The cache hierarchy then forwards any needed memory requests to the memory controller on the event of a cache miss.

Note that if, in the preceding example, none of the other nodes (e.g., none of chips 1-3) are caching the needed translation information, chip 0 receives no responses for the TLB request. In this scenario, TLB controller 404 still receives the needed translation information when the speculative TLB walk eventually completes, as described in FIG. 3, and the critical path latency for the TLB miss scenario is as described for FIG. 3.

In contrast, when a transmitted TLB request hits in another node, the critical path latency for the physical-to-virtual page translation illustrated in FIG. 4 is:

$$T_{critical} = T_{L1miss} + T_{L2miss} + T_{net\_roundtrip} + T_{remote\_L2TLBprobe} + T_{forward\_trans} + T_{fill\_trans},$$

where: $T_{net\_roundtrip}$ is the round-trip time needed for a message to travel over the interconnect from the requesting node to the sharing node, and back; and $T_{remote\_L2TLBprobe}$ is the time needed to query the L2 TLB of the remote node. In this modified critical path latency equation, the previous most-significant component, $$n*(T_{DRAM\_acc} + T_{calc\_addr}),$$

is replaced by:

$$T_{net\_roundtrip} + T_{remote\_L2TLBprobe}.$$

Replacing the large DRAM access latency with a network access time and TLB probe latency when a translation is shared by at least one other node can substantially speed up the resolution of last-level TLB misses, thereby substantially improving overall performance. For example, for an exemplary 3 GHz processor that requires four memory accesses per page-table walk and has a memory access latency on the order of 75 ns, the DRAM access component of the page-table walk has a 900 cycle penalty. In contrast, the average round-trip latency of a TLB share request in such a processor architecture is on the order of tens of nanoseconds, which is an order of magnitude less than the page-table walk access latency. While these specific values are exemplary, they illustrate potential benefits that hold true for a wide range of architectures and technologies. In some scenarios, such comparatively lower round-trip latencies may allow a system to receive a reply and cancel a speculative page-table walk before some or even all of the associated DRAM accesses have even issued.

Figure 5:
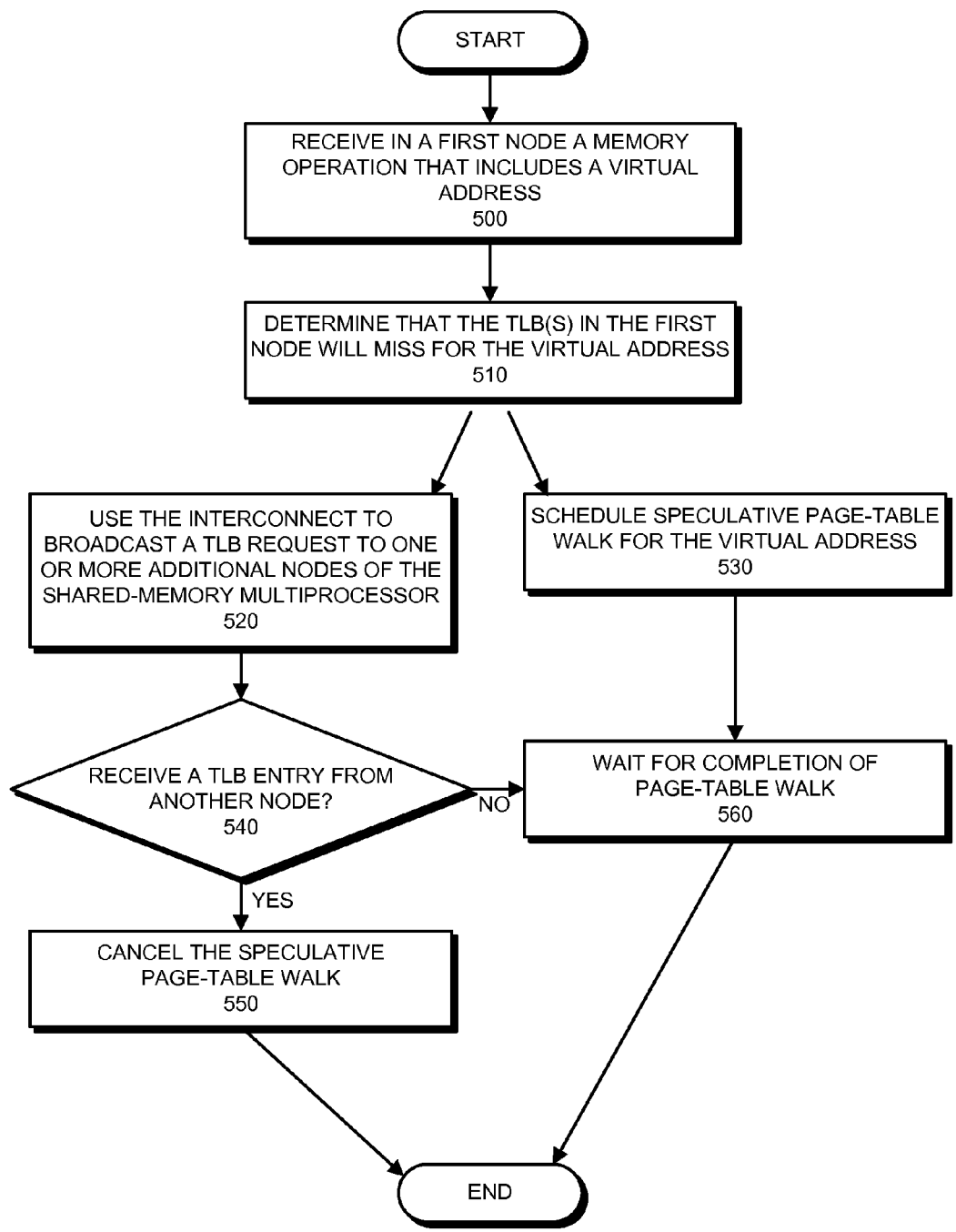
FIG. 5 presents a flow chart illustrating the process of sharing TLB entries to reduce address-translation latency in a shared-memory multiprocessor system with two or more nodes that are connected by an interconnect in accordance with an embodiment.

FIG. 5 presents a flow chart that illustrates the process of using broadcast-based TLB sharing to reduce address-translation latency in a shared-memory multiprocessor system with two or more nodes that are connected by an interconnect. During operation, a first node receives a memory operation that includes a virtual address (operation 500). Upon determining that the TLB(s) of the first node will miss for the virtual address (operation 510), the first node uses the interconnect to broadcast a TLB request to one or more additional nodes of the shared-memory multiprocessor (operation 520) in parallel with scheduling a speculative page-table walk for the virtual address (operation 530). If the first node receives a TLB entry from another node of the shared-memory multiprocessor via the interconnect in response to the TLB request (operation 540), the first node cancels the speculative page-table walk (operation 550). Otherwise, if no response is received (operation 540), the first node instead waits for the completion of the page-table walk (operation 560).

In some embodiments, broadcasting TLB requests between nodes of a cache-coherent shared-memory multiprocessor system involves some minor changes to the architecture of a multiprocessor node. More specifically, such techniques may involve changing a node's last-level TLB structure, last-level TLB controller, and link arbiter. For instance, the TLB controller logic may need to be extended to perform one or more of the following: (1) use a small amount of additional hardware to track the state of TLB requests that are broadcast to other nodes; (2) issue speculative TLB page-table walks; (3) determine whether an incoming response relates to a pending TLB request and, if so, cancel the associated speculative TLB page-table walk; and (4) determine whether the output of a speculative TLB page-table walk relates to a pending TLB request and, if so, remove the tracked state for that pending TLB request. Note that even with these capabilities, the TLB controller is relatively state-free, with no directories (e.g., mappings of virtual addresses to responsible nodes) or other forms of bookkeeping. Modifications to the link arbiter may include extensions that allow the link arbiter to correctly route requests and responses to and from the cache controller and the TLB controller. The lowest-level TLB may be extended to accommodate the additional traffic received from other nodes. For example, the lowest-level TLB may be implemented as a multi-banked structure with multiple read ports and one write port per bank, where one or more read ports are dedicated to accesses from the local processor cores and one or more other read ports are dedicated to incoming probes over the interconnect.

3. Exemplary Interconnect Implementations

Coherent shared-memory multiprocessor systems usually include a set of directory controllers that include coherency logic. Such coherency logic is typically included in each node (e.g., in a processor chip or, as illustrated in FIG. 2, in a separate directory chip). The nodes are coupled together by a communication interconnect (e.g., a "coherency interconnect") that allows nodes to update one another when cached data changes, thereby ensuring the consistency of their respective data caches. This communication interconnect can take a number of different forms; for instance, the underlying interconnect may be electrical or optical. Furthermore, the communication interconnect may involve a range of topologies (e.g., a point-to-point interconnect, a switch-based interconnect, or a bus-based interconnect). Interconnect implementations may vary depending on factors such as the available technology, desired performance, and desired scale of the system (e.g., the number of nodes). For example, point-to-point interconnects (e.g., illustrated in FIG. 1 for an 8-node coherent shared-memory multiprocessor system) may be difficult to scale as the number of nodes grows, due to the number of needed connections and additional pin and bandwidth constraints. Switched interconnects reduce the number of connections needed, but require the design of a high-speed directory switch (or other switch type) in the interconnect.

Figure 6:
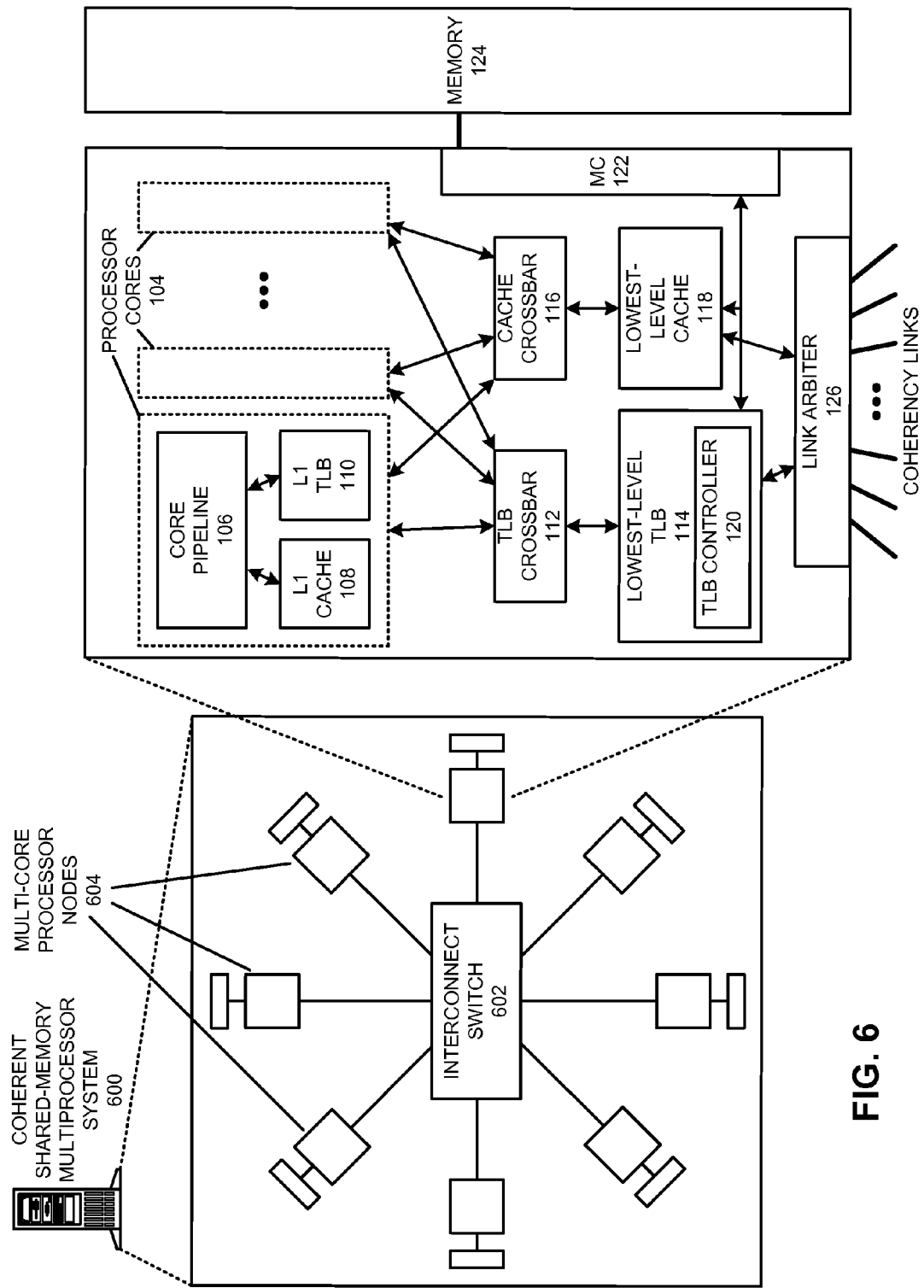
FIG. 6 illustrates an exemplary architecture of a coherent shared-memory multiprocessor system with a switched interconnect in accordance with an embodiment.

FIG. 6 illustrates an exemplary architecture of a coherent shared-memory multiprocessor system 600 with a switched interconnect. In FIG. 6, interconnect switch 602 routes messages among the multi-core processor nodes 604.

In some embodiments, broadcast-based TLB sharing techniques involve initiating a broadcast request over the interconnect on every last-level TLB miss. One logistical consideration involves replicating and actually sending these TLB requests. For example, in some implementations of point-to-point interconnect, a broadcasting node needs to ensure that the TLB request is replicated for every target node. In some implementations of switched interconnects the broadcasting node is similarly responsible, while in other switched implementations the switch may perform the replication operation. Another alternative is to use a relay technique, where each node is configured to broadcast to a subset of nodes, and each of the receiving nodes then replicates and forwards the TLB request to an additional set of nodes. Such relay techniques increase delay and complexity, but reduce the replication overhead for a broadcasting node and/or switch.

In some embodiments, the TLB requests issued by broadcast-based TLB sharing techniques use the same coherence interconnect as data transactions. The resulting additional TLB requests and coherence traffic may increase the load on the existing coherence networks and increase the demand for off-chip bandwidth in each node. These networks are typically packet-based, and the additional TLB requests (or other coherence network traffic) may increase the delay of remote lookups. Thus, in some embodiments, such techniques may also involve re-provisioning the interconnect to increase bandwidth and routing capabilities and/or switching to optical interconnects. Note also that the increased TLB traffic reduces the number of requests to DRAM; in some embodiments, re-provisioning to balance the load may involve reducing the provisioning for the page-walk infrastructure and shifting the resulting additional available resources to the memory coherence network.

In some embodiments, an existing data coherence interconnect may be supplemented by additional communication infrastructure. For instance, electrical interconnect implementations may enable the simultaneous use of multiple types of interconnect. For example, an exemplary electrical interconnect may combine a separate bus-based network for TLB requests with a different (e.g., point-to-point or switched) data coherency interconnect. TLB misses are relatively infrequent, but have a high performance impact, as discussed in more detail in the following section. Because the number of TLB requests is typically fairly low, such requests do not require a large amount of network bandwidth. Thus, using a bus-based network to propagate TLB requests to other nodes scales well architecturally; the (typically small) set of nodes caching the needed translation information can then send responses (e.g., the needed TLB entry) through the data coherency interconnect to the requesting node.

Figure 7:
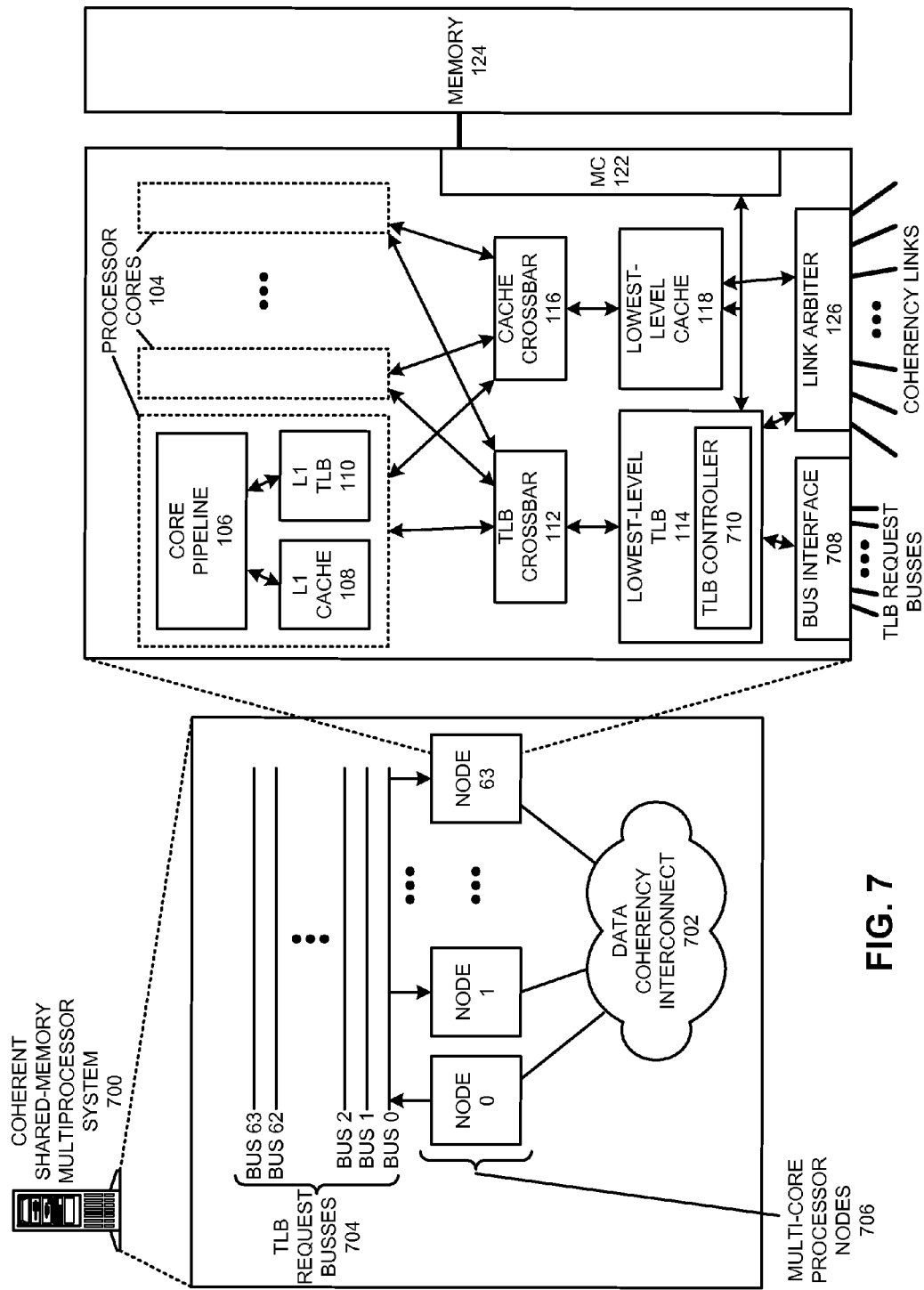
FIG. 7 illustrates an exemplary architecture of a coherent shared-memory multiprocessor system with an electrical interconnect that includes a separate set of TLB request busses in accordance with an embodiment.

FIG. 7 illustrates an exemplary architecture of a coherent shared-memory multiprocessor system 700 with an electrical interconnect that includes a separate set of TLB request busses 704. In this example, the electrical interconnect includes a separate TLB request bus for each of the multi-core processor nodes 706. These busses have much lower bandwidth (e.g., require fewer pins, and are clocked at a much lower speed) than the data coherency interconnect 702. Responses to TLB requests are sent via data coherency interconnect 702; because the TLB miss rate is typically low, this response traffic does not substantially increase the bandwidth needs of data coherency interconnect 702.

In FIG. 7, each node includes a bus interface 708 that transmits to the node's dedicated TLB request bus and monitors the other nodes' TLB request busses. For instance, the bus interface 708 of node 0 writes to bus 0, which is read by the bus interfaces 708 of the other 63 nodes. The TLB controller 710 of each node is extended to send TLB requests via bus interface 708 and monitor for responses via link arbiter 126. Because of the bus-based network, node 0 only needs to send one message instead of replicating the TLB request 63 times; in contrast, sending the TLB request via data coherency interconnect 702 would require 63 times more bandwidth.

Note that including a separate broadcast bus for each node involves some additional overhead (e.g., additional wiring and cabling); this overhead is typically much less than for a point-to-point interconnect, and achievable for an electrical interconnect (e.g., using amplified busses). For instance, while a 64-node system with a bus-based broadcast network might involve 64 busses (as illustrated), a point-to-point interconnect typically involves a much more substantial 4096 different connection segments. A 64-node system with a switched interconnect only requires 64 connections, but would also require a potentially complex (e.g., multi-tiered) interconnect switch. However, a bus-based network in which each node broadcasts to a dedicated bus (that is monitored by every other node) may not scale for some large system sizes.

In some embodiments, an exemplary electrical interconnect may include a separate bus-based network for TLB requests where individual nodes broadcast on multiple busses and/or subsets of nodes share dedicated busses. For instance, each node may be configured to broadcast over multiple dedicated busses, where each of these dedicated busses is monitored by only a subset of other nodes in the shared-memory multiprocessor system. For example, in a 64-node system, each node may be configured to broadcast over 4 dedicated busses, where the four busses are each respectively monitored by four distinct sets of nodes. In other variations, if TLB requests are fairly infrequent, multiple nodes may be able to use the same bus to send TLB requests with a low probability of collisions. For instance, in one implementation, a node may be configured to broadcast to one or more shared busses that are routed to either all nodes or various subsets of nodes.

Unfortunately, implementing busses in an optical interconnect is more challenging; every node reading from an optical signal removes light from the optical signal; hence, an optical bus would need n times the light to reach n targets. As the number of nodes in the system scales, the amount of light needed to broadcast TLB requests using a bus becomes less feasible. Thus, in some embodiments, optical fundamentals may motivate implementing a single optical topology that carries both cache coherency and broadcast-based TLB sharing traffic (e.g., implementing an optical interconnect using a point-to-point or a switched topology). As described above, in such implementations one of (1) a lowest-level TLB, (2) a link arbiter or (3) an optical switch will need to replicate the TLB request for each target node. Note that the replicating mechanism needs to be able to selectively distinguish TLB requests (which are replicated) from other transactions (e.g., requests from the cache controller) that do not need to be replicated. For example, a TLB controller may include logic that duplicates a TLB request into the per-link transmit buffers of a link arbiter. Alternatively, a link arbiter may scan the headers of packets received from the TLB controller to determine whether a given packet contains a TLB request that needs to be duplicated, and then undertake the needed replication.

While some optical topographies typically require n−1 times more bandwidth than the bus-based technique described above for electrical interconnects, optical interconnect also provides substantially higher bandwidth and bandwidth density, making the additional bandwidth use less of an issue. Note that in some embodiments optical point-to-point links may comprise different wavelengths in a given optical beam. Note also that optical connections are not limited to optical fibers, but may also be achieved using embedded optical transmitters/receivers and/or substrates that include optical waveguides.

In some embodiments, TLB requests are broadcast to a subset of the nodes of a coherent shared-memory multiprocessor system. For instance, as the number of nodes scales, the overhead of broadcasting TLB requests to every other node may increase, and the probability of finding a needed TLB entry in a subset of the nodes may also increase. For example, the set of nodes may be partitioned into two or more sets, with nodes in each set only broadcasting TLB requests to their respective subset.

4. Considerations for Broadcast-Based TLB-Sharing Techniques

As mentioned previously, TLB misses are typically fewer than data cache misses. TLBs are smaller than data caches, but because memory pages are large, each TLB entry covers a wide address range, and address translations benefit from locality. However, the penalty for a TLB miss is typically much higher than for a data access—a page-table walk of a hierarchical page table often involves four or more DRAM accesses. Hence, the disclosed techniques can improve performance and reduce power consumption by reducing the number of page-table walks.

Note that the disclosed techniques are distinct from other techniques that attempt to reduce address-translation latency by combining the last-level TLB structures of two or more nodes of a coherent shared-memory system into a shared last-level TLB. In such systems, nodes typically need to either maintain state that identifies which nodes possess a TLB entry or statically partition the virtual address space across the nodes. For example, each node may include additional directory structures to track the TLB entries of a portion of the virtual address space. Such directory-based techniques can be prone to directory overflows, where a particular directory or set of directories are disproportionately accessed. For instance, certain workloads with highly localized memory access patterns over small working sets can cause frequent evictions of needed TLB entries, which can lead to a large number of TLB misses and severely impact performance. Broadcast-based inter-node TLB sharing avoids this issue by not maintaining any sharing state for TLB entries. Instead, the inter-node broadcasts propagate TLB requests to all of the last-level TLBs on a TLB miss, thereby preventing a single directory from becoming a bottleneck for localized access patterns. Broadcast-based TLB sharing also avoids the significant power and area overheads associated with maintaining additional directory structures.

Another frequent constraint of some directory-based shared last-level TLBs is that, due to the partitioning of virtual memory space across nodes, TLB accesses can lead to frequent remote accesses. For example, if a given node is responsible for managing a virtual address range that includes a given address, a different node requesting a page translation for the given address may be required to contact the managing node to perform the needed translation; more specifically, the requesting node may need to contact the (remote) managing node not because the managing node is using the needed translation information, but because the managing node has been designated as the "manager/owner" of that virtual address range (and, hence, the needed translation information). Broadcast-based inter-node TLB sharing avoids this constraint; any translation may reside in any last-level TLB in the shared-memory system, and the TLBs of remote nodes are only accessed when the local node has missed in its own lowest-level TLB and broadcast a TLB request.

In some embodiments, the disclosed techniques can complement a wide range of TLB architectures. For instance, the disclosed techniques can be implemented in conjunction with strictly inclusive, strictly exclusive, or non-inclusive TLB hierarchies. Note that, while some TLB implementations sharing TLB information across nodes may increase the complexity of TLB "shoot-downs" (e.g., managing multi-level TLB invalidations across multiple nodes), the above-described TLB-sharing techniques are distinct from other proposed techniques that relate to improving the performance of TLB shoot-downs. For example, in a non-inclusive or exclusive TLB hierarchy, each L2 TLB may need to either: (1) probe every L1 TLB in its node to determine where a (now) invalid translation is stored; or (2) track which L1 TLBs are currently caching each translation. However, while TLB shoot-down techniques seek to reduce the overhead involved in invalidating TLB entries, the described broadcast-based TLB-sharing techniques strive to improve performance by reducing the number of page-table walks (and thereby reducing the average latency of address translation). In general, the described broadcast-based TLB-sharing techniques are complementary to, and can be implemented in parallel with, any desired TLB shoot-down techniques.

The disclosed techniques facilitate sharing TLB translations between cores on the same chip and cores on different chips "on demand" during a TLB miss. Thus, the above-described TLB-sharing techniques are distinct from pre-fetching-based techniques that attempt to track address access patterns to predict future TLB accesses by cores, and then pre-fetch translations for these predicted accesses. Unlike such pre-fetching techniques, the above-described TLB-sharing techniques do not need to perform such tracking, and do not suffer from bandwidth wastage due to false positives. Furthermore, broadcasting TLB requests on-demand does not require the complex sharing metrics and prediction mechanisms that are typically required by pre-fetching techniques to determine when to share or push translations to other TLBs.

The above-described broadcast-based TLB-sharing techniques are also distinct from snooping-based techniques. Snooping mechanisms typically use a shared centralized bus that allows each core to read (or "snoop") all other cores' memory/TLB accesses. Some snooping techniques allow capacity sharing among multiple TLBs. For example, capacity sharing can be achieved by having TLBs snoop the miss requests of other TLBs, and moving evicted victims from an evicting TLB to a neighbor TLB (instead of flushing them completely). However, while such snooping techniques can provide some capacity sharing, the centralized bus required by snooping techniques becomes a bottleneck as clock rates and core densities increase, which can present significant scaling challenges. In contrast, the above-described techniques do not require snooping mechanisms or a centralized bus, and instead use and/or extend existing hardware cache coherence infrastructure (e.g., interconnects, directories, etc). Using existing coherence networks enables the described techniques to scale without the substantial power and complexity penalties traditionally suffered by snooping protocols, and also eliminates the complex sharing metrics and prediction mechanisms that are required to determine when to share or push translations to other TLBs.

Note that broadcast-based TLB-sharing techniques can be used in conjunction with a range of coherence protocols (e.g., the MOESI cache coherency protocol) that maintain cache coherence across the nodes; more specifically, the described techniques can build upon any cache coherence protocol that facilitates maintaining coherence across multiple caches. Note also that, as mentioned previously, the architectures illustrated in FIGS. 1-2 and 6-7 are exemplary; the described techniques and structures are not limited to the described shared-memory systems, and can be applied to a range of architectures.

In summary, embodiments of the present invention enable TLB entries to be shared between nodes of a shared-memory multiprocessor system. A node broadcasts a page-translation sharing request over an inter-node interconnect when a memory operation misses in the node's last-level TLB; other nodes caching the needed address-translation information can then share this information with the requesting node via the data coherence interconnect.

Specific advantages of the disclosed techniques include:
- reducing the latency of the critical cache miss path by hundreds of cycles;
- involving only logic changes to a shared-memory system—no additional cache or directory structures are required;
- not requiring any application-level changes;
- re-using and/or extending existing cache coherence hardware (interconnects, directories, etc.) to enable broadcast-based TLB sharing capabilities; and
- reducing total application execution time and dynamic energy consumption by reducing the number of page-table walks and thus the number of system DRAM accesses.

5. Computing Environment

Figure 8:
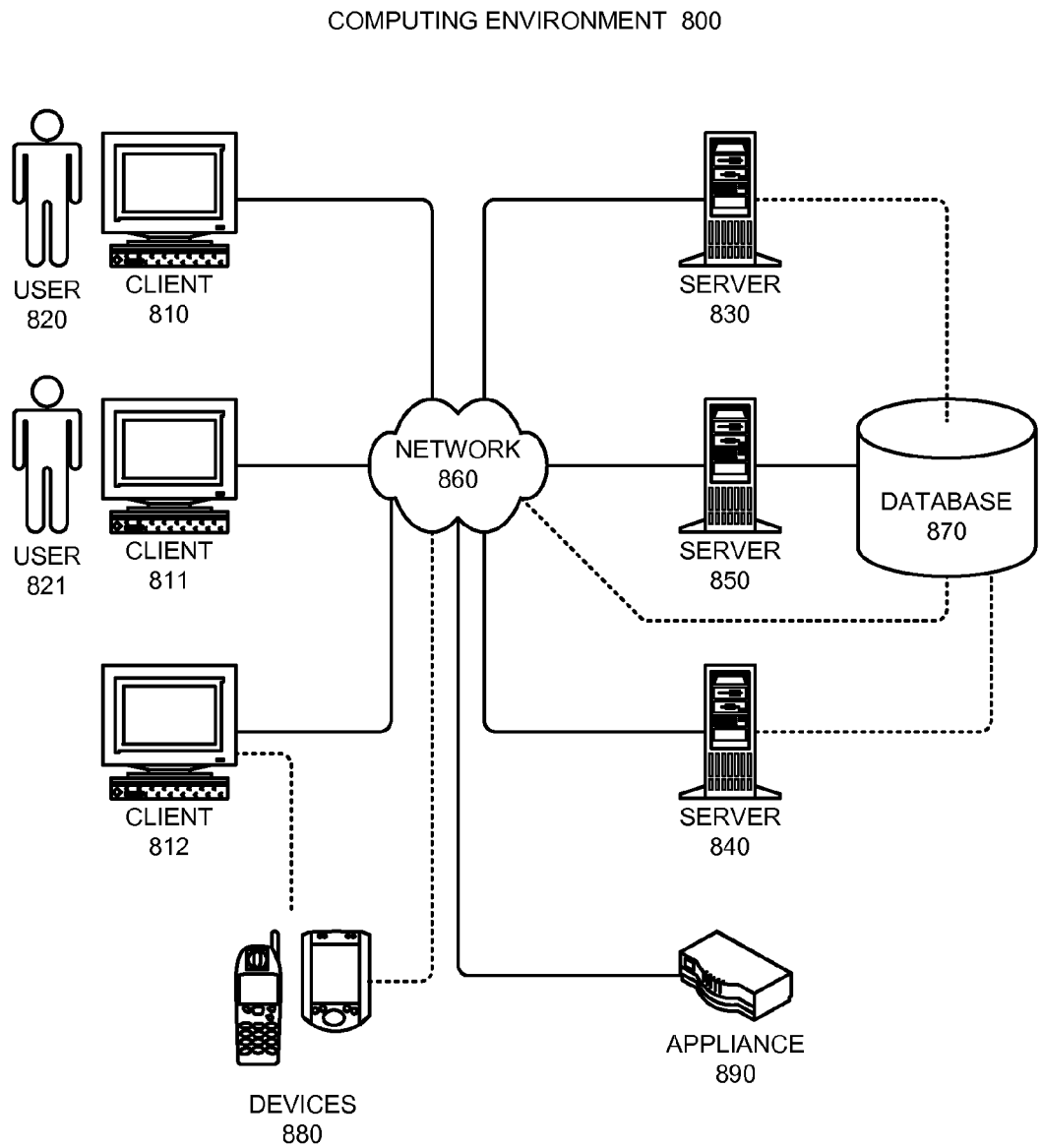
FIG. 8 illustrates a computing environment in accordance with an embodiment.

In some embodiments of the present invention, broadcast-based TLB-sharing techniques can be incorporated into a wide range of computing devices in a computing environment. For example, FIG. 8 illustrates a computing environment 800 in accordance with an embodiment of the present invention. Computing environment 800 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 8, computing environment 800 includes clients 810-812, users 820 and 821, servers 830-850, network 860, database 870, devices 880, and appliance 890.

Clients 810-812 can include any node on a network that includes computational capability and includes a mechanism for communicating across the network. Additionally, clients 810-812 may comprise a tier in an n-tier application architecture, wherein clients 810-812 perform as servers (servicing requests from lower tiers or users), and wherein clients 810-812 perform as clients (forwarding the requests to a higher tier).

Similarly, servers 830-850 can generally include any node on a network including a mechanism for servicing requests from a client for computational and/or data storage resources. Servers 830-850 can participate in an advanced computing cluster, or can act as stand-alone servers. For instance, computing environment 800 can include a large number of compute nodes that are organized into a computing cluster and/or server farm. In one embodiment of the present invention, server 840 is an online "hot spare" of server 850. In other embodiments, servers 830-850 include coherent shared-memory multiprocessors.

Users 820 and 821 can include: an individual; a group of individuals; an organization; a group of organizations; a computing system; a group of computing systems; or any other entity that can interact with computing environment 800.

Network 860 can include any type of wired or wireless communication channel capable of coupling together computing nodes. This includes, but is not limited to, a local area network, a wide area network, or a combination of networks. In one embodiment of the present invention, network 860 includes the Internet. In some embodiments of the present invention, network 860 includes phone and cellular phone networks.

Database 870 can include any type of system for storing data in non-volatile storage. This includes, but is not limited to, systems based upon magnetic, optical, or magneto-optical storage devices, as well as storage devices based on flash memory and/or battery-backed up memory. Note that database 870 can be coupled: to a server (such as server 850), to a client, or directly to a network.

Devices 880 can include any type of electronic device that can be coupled to a client, such as client 812. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 880 can be coupled directly to network 860 and can function in the same manner as clients 810-812.

Appliance 890 can include any type of appliance that can be coupled to network 860. This includes, but is not limited to, routers, switches, load balancers, network accelerators, and specialty processors. Appliance 890 may act as a gateway, a proxy, or a translator between server 840 and network 860.

Note that different embodiments of the present invention may use different system configurations, and are not limited to the system configuration illustrated in computing environment 800. In general, any device that includes two or more processing nodes, last-level TLBs, one or more levels of caches, and a coherent memory-sharing architecture may incorporate elements of the present invention.

In some embodiments of the present invention, some or all aspects of broadcast-based TLB sharing techniques can be implemented as dedicated hardware modules in a computing device. These hardware modules can include, but are not limited to, processor chips, application-specific integrated circuit (ASIC) chips, field-programmable gate arrays (FPGAs), memory chips, and other programmable-logic devices now known or later developed.

Note that a coherent shared-memory processor can include one or more specialized circuits for performing the operations of the above-described broadcast-based TLB-sharing techniques. Alternatively, some or all of the operations may be performed using general-purpose circuits that are configured using processor instructions. Also, while FIGS. 1-4 and 6-7 illustrate broadcast-based TLB-sharing logic as being internal to a processor, in alternative embodiments some or all of these mechanisms can be external to a processor.

In these embodiments, when the external hardware modules are activated, the hardware modules perform the methods and processes included within the hardware modules. For example, in some embodiments of the present invention, the hardware module includes one or more dedicated circuits for performing the operations described above. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using broadcast-based TLB sharing to reduce address-translation latency, wherein the method operates in a shared-memory multiprocessor system with two or more nodes that are connected by an optical interconnect, the method comprising:
   receiving a memory operation that includes a virtual address; and
   upon determining a TLB miss for the virtual address in a TLB in a first node of the shared-memory multiprocessor system:
      using the optical interconnect to broadcast a TLB request to one or more additional nodes of the shared-memory multiprocessor in parallel with scheduling a speculative page-table walk for the virtual address, and
      upon receiving a TLB entry from another node of the shared-memory multiprocessor via the optical interconnect in response to the TLB request, canceling the speculative page-table walk.

2. The method of claim 1, wherein broadcasting the TLB request further comprises:
   distinguishing the TLB request from other request traffic from the first node; and
   selectively replicating TLB requests to ensure that the TLB request node is sent to each of the other nodes of the shared-memory multiprocessor system via the optical interconnect.

3. The method of claim 2, wherein the optical interconnect comprises an optical point-to-point network between the nodes of the shared-memory multiprocessor system.

4. The method of claim 3, wherein the optical point-to-point network carries TLB requests, TLB entries, and cache coherency traffic.

5. The method of claim 4, wherein a first link in the optical point-to-point network and a second link in the optical point-to-point network use different wavelengths in a single optical beam.

6. The method of claim 2,
   wherein the optical interconnect comprises an optically switched interconnect that facilitates communication between the nodes of the shared-memory multiprocessor system; and
   wherein the optically switched interconnect carries TLB requests, TLB entries, and cache coherency traffic.

7. The method of claim 6, wherein a smart switch in the optically switched interconnect replicates the TLB request and sends the replicated TLB requests to two or more nodes of the shared-memory multiprocessor system.

8. The method of claim 2, wherein a TLB controller in the first node replicates the TLB request and sends the replicated TLB requests to the other nodes of the shared-memory multiprocessor system.

9. The method of claim 2, wherein a link arbiter in the first node replicates the TLB request and sends the replicated TLB requests to the other nodes of the shared-memory multiprocessor system.

10. A shared-memory multiprocessor that uses broadcast-based TLB sharing to reduce address-translation latency, comprising:
    a first node;
    two or more additional nodes; and
    an optical interconnect that facilitates communication between the first node and the two or more additional nodes;
    wherein the first node receives a memory operation that includes a virtual address; and
    wherein the first node, upon determining a TLB miss for the virtual address in a TLB in a first node of the shared-memory multiprocessor system, is configured to:
       use the optical interconnect to broadcast a TLB request to one or more additional nodes of the shared-memory multiprocessor in parallel with scheduling a speculative page-table walk for the virtual address, and
       upon receiving a TLB entry from another node of the shared-memory multiprocessor via the optical interconnect in response to the TLB request, cancel the speculative page-table walk.

11. The shared-memory multiprocessor of claim 10, wherein broadcasting the TLB request further comprises:
    distinguishing the TLB request from other request traffic from the first node; and
    selectively replicating TLB requests to ensure that the TLB request node is sent to each of the other nodes of the shared-memory multiprocessor via the optical interconnect.

12. The shared-memory multiprocessor of claim 11,
    wherein the optical interconnect comprises an optical point-to-point network between the nodes of the shared-memory multiprocessor system; and
    wherein the optical point-to-point network carries TLB requests, TLB entries, and cache coherency traffic.

13. The shared-memory multiprocessor of claim 12, wherein a first link in the optical point-to-point network and a second link in the optical point-to-point network use different wavelengths in a single optical beam.

14. The shared-memory multiprocessor of claim 11,
    wherein the optical interconnect comprises an optically switched interconnect that facilitates communication between the nodes of the shared-memory multiprocessor system;
    wherein the optically switched interconnect carries TLB requests, TLB entries, and cache coherency traffic; and
    wherein a smart switch in the optically switched interconnect replicates the TLB request and sends the replicated TLB requests to two or more nodes of the shared-memory multiprocessor system.

15. The shared-memory multiprocessor of claim 11, wherein a TLB controller in the first node replicates the TLB request and sends the replicated TLB requests to the other nodes of the shared-memory multiprocessor system.

16. The shared-memory multiprocessor of claim 11, wherein a link arbiter in the first node replicates the TLB request and sends the replicated TLB requests to the other nodes of the shared-memory multiprocessor system.

17. The shared-memory multiprocessor of claim 11, wherein the first node comprises a TLB controller that is configured to:
    track the state of TLB requests that are broadcast to other nodes;

issue speculative TLB page-table walks;

determine whether an incoming response relates to a pending TLB request and, if so, cancel an associated speculative TLB page-table walk for the pending TLB request; and determine whether the output of a speculative TLB page-table walk relates to a second pending TLB request, and if so, remove the tracking state for the second pending TLB request from the TLB controller.

18. The shared-memory multiprocessor of claim 17, wherein the first node further comprises a link arbiter that is configured to analyze traffic to correctly route requests and responses to and from a cache controller and the TLB controller.

19. The shared-memory multiprocessor of claim 18, wherein the TLB is configured to accommodate additional TLB request traffic from other nodes;

wherein the TLB includes multiple read ports per bank;

wherein one or more read ports of the TLB are configured to respond to TLB requests from processor cores local to the first node; and wherein one or more read ports of the TLB are configured to respond to TLB requests received from other nodes via the electrical interconnect.

20. A TLB structure that uses broadcast-based TLB sharing to reduce address-translation latency in a shared-memory multiprocessor, comprising:

a TLB controller that is associated with a TLB in the TLB structure;

wherein the shared-memory multiprocessor comprises two or more nodes and an optical interconnect that facilitates communication between the nodes;

wherein each node of the shared-memory multiprocessor comprises one or more processor cores and at least one of the TLB structure;

wherein a first node of the shared-memory multiprocessor receives a memory operation that includes a virtual address; and wherein the TLB controller of the first node, upon determining a TLB miss for the virtual address in a TLB, is configured to:

use the optical interconnect to broadcast a TLB request to one or more additional nodes of the shared-memory multiprocessor in parallel with scheduling a speculative page-table walk for the virtual address, and upon receiving a TLB entry from another node of the shared-memory multiprocessor via the optical interconnect in response to the TLB request, cancel the speculative page-table walk.

\* \* \* \* \*